US012366362B2

(12) United States Patent
Jager et al.

(10) Patent No.: US 12,366,362 B2
(45) Date of Patent: Jul. 22, 2025

(54) KNOB MECHANISM FOR GAS COOKTOP

(71) Applicant: WHIRLPOOL CORPORATION, Benton Harbor, MI (US)

(72) Inventors: Sergio Ricardo Jager, Rio Claro (BR); Ledimara Mascarello, Joinville (BR); Thomas Ponick, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 851 days.

(21) Appl. No.: 17/583,914

(22) Filed: Jan. 25, 2022

(65) Prior Publication Data

US 2023/0235889 A1 Jul. 27, 2023

(51) Int. Cl.
*F24C 3/12* (2006.01)
*G05G 1/08* (2006.01)
*G05G 5/03* (2008.04)

(52) U.S. Cl.
CPC ............... *F24C 3/126* (2013.01); *G05G 1/08* (2013.01); *G05G 5/03* (2013.01); *G05G 2505/00* (2013.01)

(58) Field of Classification Search
CPC .............. G05G 5/03; G05G 5/05; F24C 3/126
USPC ........................................................ 126/39 N
See application file for complete search history.

(56) References Cited

U.S. PATENT DOCUMENTS

| | | | | |
|---|---|---|---|---|
| 8,997,591 B1 * | 4/2015 | Virck | ........................ | G05G 5/03 200/11 R |
| 10,248,153 B2 | 4/2019 | Stoufer et al. | | |
| 10,606,302 B2 | 3/2020 | Stoufer et al. | | |
| 10,746,409 B2 | 8/2020 | Ha | | |
| 2009/0049948 A1 * | 2/2009 | Hors | ..................... | B64C 13/044 74/527 |
| 2017/0351292 A1 * | 12/2017 | Stoufer | ..................... | G05G 5/04 |
| 2018/0210484 A1 * | 7/2018 | Stoufer | .................. | G01D 5/142 |

* cited by examiner

*Primary Examiner* — Jorge A Pereiro
(74) *Attorney, Agent, or Firm* — Brooks Kushman, P.C.

(57) ABSTRACT

A knob assembly for a gas cooktop may include a knob configured to control a flow of gas from a burner of a cooktop starting at an off position, a knob mechanism arranged between the knob and the cooktop, the knob mechanism including a first part arranged below an underside of the knob, and a second part connected to the first part via a spring mechanism, where the first part is fixed to the knob and configured to rotate with the knob and the spring mechanism is configured to bias against the rotation.

20 Claims, 4 Drawing Sheets

KNOB MECHANISM FOR GAS COOKTOP

TECHNICAL FIELD

Described herein are hinge systems for a knob mechanism for gas cooktops.

BACKGROUND

A cooking appliance is used to cook meals and other foodstuffs on a cooktop or within an oven. The cooking appliance typically includes various control switches and electronics to control the heating elements of the cooking appliance.

SUMMARY

A knob assembly for a gas cooktop may include a knob configured to control a flow of gas from a burner of a cooktop starting at an off position, a knob mechanism arranged between the knob and the cooktop, the knob mechanism including a first part arranged below an underside of the knob, and a second part connected to the first part via a spring mechanism, where the first part is fixed to the knob and configured to rotate with the knob and the spring mechanism is configured to bias against the rotation.

A knob assembly for a gas cooktop may include a knob configured to rotate between an off position and an on position corresponding to a desired heat setting to control a flow of gas from a burner of a cooktop, and a knob mechanism arranged between the knob and the cooktop, the knob mechanism including a first part fixed to an underside of the knob, and a second part connected to the first part via a spring mechanism, where the first part is fixed to the knob to provide for rotation with the knob and the spring mechanism is configured to bias against the rotation, wherein the spring mechanism has a first end attached to the first part and a second end attached to the second part, the second part defining an elongated channel configured to receive the first end of the spring mechanism such that as the first part rotates with respect to the second part, the second end travels through the channel to impart resistance against the rotation of the knob from the off position due to a bias between the first end and second end of the spring mechanism.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Knobs in gas cooktops and freestanding ranges are often sensitive to actuation and may be accidentally turned on. While not intended, such accidental actuations or rotations may release gas unknowingly. As described in detail herein, an improved system allows for a resistance to be applied to the actuation during the start of the spark. This resistance may ensure that any release of gas is in response to actuations that are deliberate and not accidental.

The system may include a knob mechanism arranged between the knob and the cooktop. The knob mechanism may generally include three components, a top part, bottom part, and a spring. The top part may be added to a valve shaft of the knob and the bottom part may be fitted with a switch harness. The spring connects both parts and to provide a resistance against rotation of the knob. From an off position of the knob, a user may start to rotate the knob and the spring will create resistance to that rotation. If the rotation was accidental, the spring will impart a force to return the knob back to the off position. If the rotation was done on purpose by a user, the user will continue to fight against the resistance and rotate the knob until the spark starts to produce a sound and gas is flowing to the burner.

After rotating past the area that creates the spark, the knob may move freely to allow the user to select the desired position of the knob for the desired gas flow. In this example, the knob mechanism is not actuating or applying any resistance against the rotation of the knob.

Figure 1:
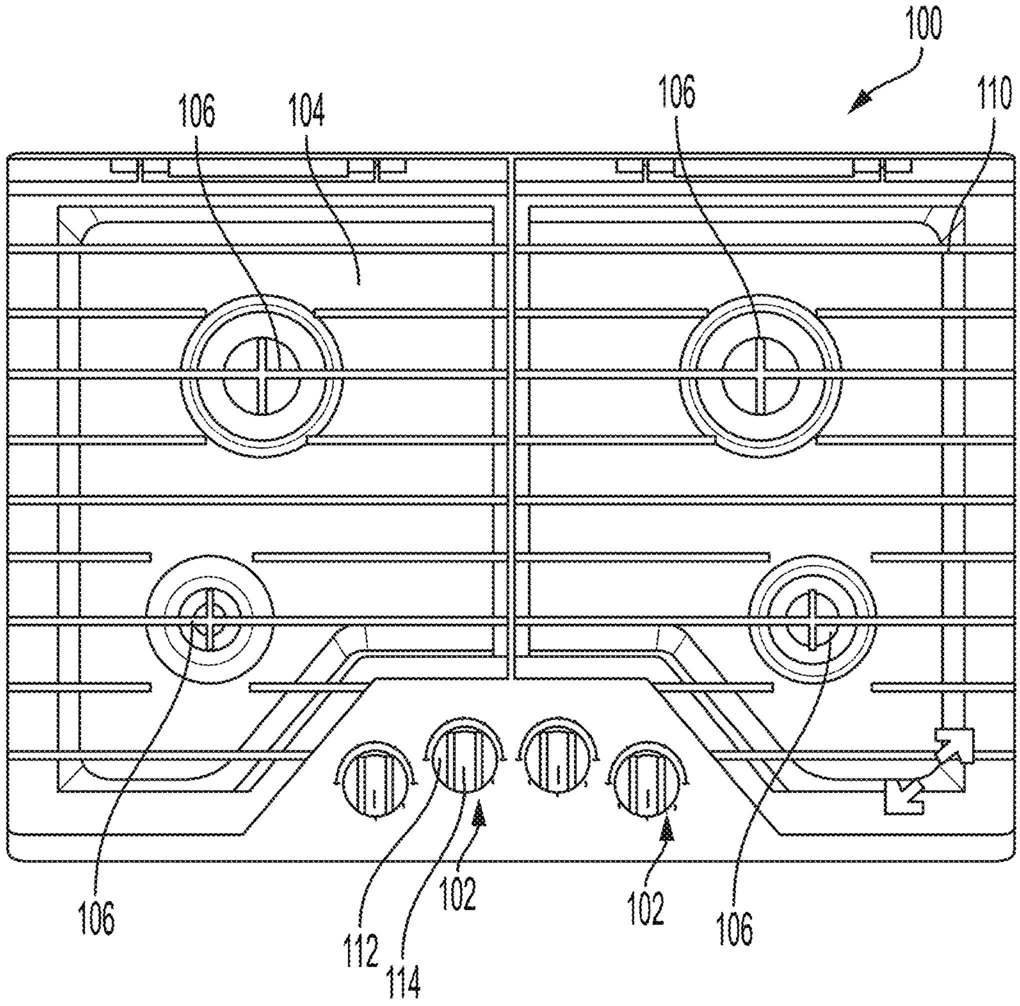
FIG. 1 illustrates an example cooktop, such as a gas cooktop.

FIG. 1 illustrates an example cooktop 100, such as a gas range assembly. The cooktop 100 may include a cooking area 104 having a plurality of burners 106, each controlled by a knob 102. Each separately controlled burner 106 is dedicated to supplying heat to that area of the cooking area 104. The heat supplied to each separately controlled heating area is controlled such that a command to change the heat supplied to it may not change the amount of heat supplied to any other separately controlled cooking area 104. In the example of FIG. 1, the cooktop 100 has four separately controlled cooking areas 104, but more or fewer cooking areas 104 may be included.

One or more grates 110 may be arranged above the cooking area 104 in order to maintain cookware thereon a predefined distance above the burners 106. Each grate 110 may be made of metal, iron, or some other thermally conductive element. Each burner 106 may be operable to heat to desired cooking temperatures. In an example, each knob 102 is configured to control the flow of gas to a respective one of the burners 106. The knobs 102 may be labeled to allow a user to identify which knob 102 controls which of the burners 106. The burners 106 are configured to generate controlled flames that may be used to heat cookware arranged on the grate 110. The magnitude of the flame generated by the burners 106 is proportionate to the amount of gas flowing to the burners 106. A user may adjust the flow of gas to the burners 106 using the knobs 102. As the user rotates each of the knobs 102, a gas control valve (not shown) changes the amount of gas flowing to the corresponding burner 106.

While the knobs 102 in the example of FIG. 1 are illustrated as being arranged on top of the cooking area 104, the knobs may also be arranged on a front surface of a manifold of the cooktop 100. The knobs 102 may include markings therearound to indicate a certain level of heat being supplied by the burner 106 relative to the rotational position of the knob 102. For example, markings associated with a high, medium, low, simmer settings may be included. Each knob 102 has a face 112 with a grip 114 extending outwardly from the face 112. It should be appreciated that in other embodiments each knob 102 may be contemplated, such as the knob 102 being shaped as a cylinder or oval without a grip.

Figure 3:
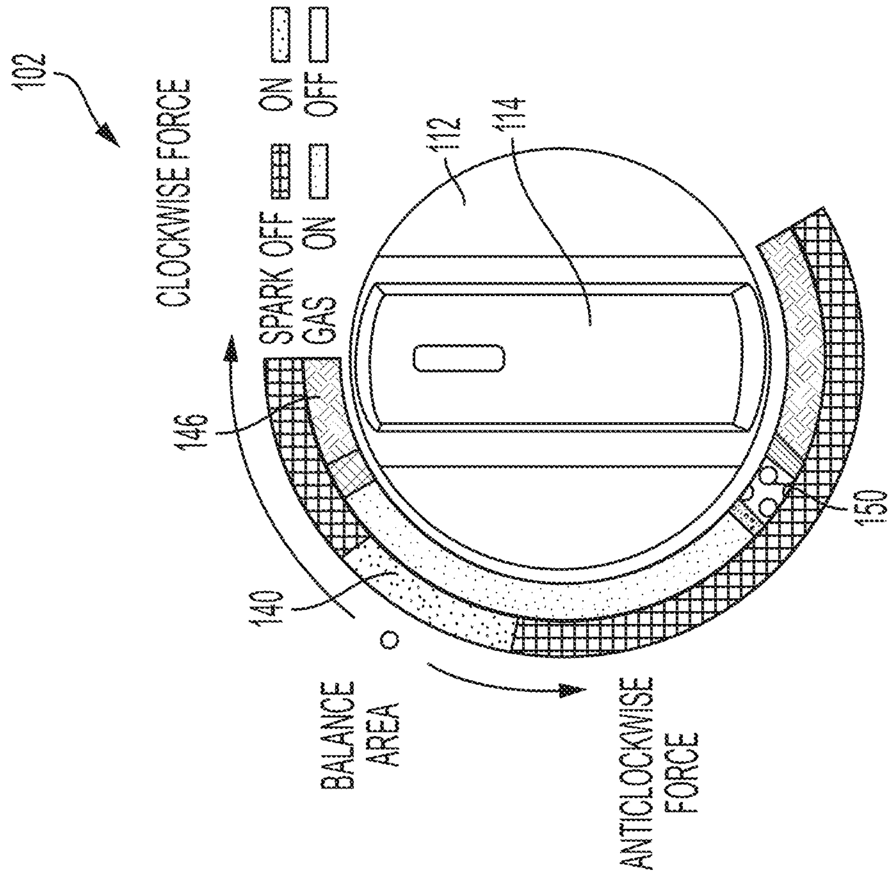
FIG. 3 illustrates an example knob of the cooktop of FIG. 1, where the knob is in an off position.
Figure 2:
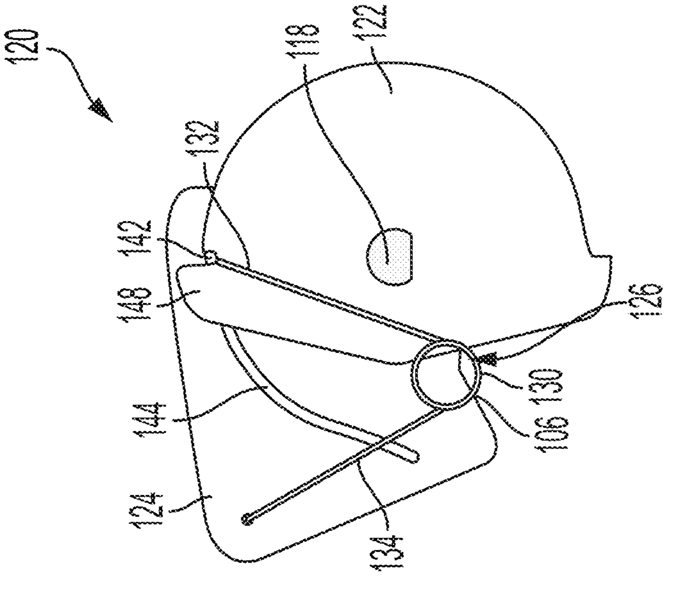
FIG. 2 illustrates an example knob mechanism for a knob of the cooktop of FIG. 1, where the knob is in an off position.

FIG. 2 illustrates an example knob mechanism 120 for the knobs 102 of the cooktop 100 of FIG. 1, where the knob 102 is in an off position 146. FIG. 3 illustrates the example knob 102 of the cooktop of FIG. 1. Referring to FIGS. 2 and 3, the knob mechanism 120 may be arranged between the knob 102 and the cooking area 104.

The knob 102 may actuate or rotate in order to vary the flow of gas from the burner 106. In an off position 146, the flow of gas may be stopped, or completely off In an on area 150, a gas line may be opened via a valve to allow variable gas to flow to the burners 106. The knob 102 may control the opening and closing of the valve and provide for a variable amount of gas to flow. The knob 102 may be actuated to a specific position so as to allow a certain flow of gas. Prior to reaching the on position, the knob 102 must first rotate past a predefined distance to open the valve to initiate the flow of gas. This distance is referred to herein as the balance area 140. The balance area 140 may be the area where the rotation of the knob 102 causes the spark to start, which may produce a clicking sound. The clicking sound may indicate to the user that gas has started flowing.

Once the knob 102 has been rotated past the balance area 140, further rotation of the knob 102 may allow for varying levels of gas flow in the on area 150. Immediately past the balance area 140, the gas flow may be at the highest level. As the knob 102 is further rotated, the gas flow may be decreased until a desirable gas flow is achieved or the knob 102 is rotate to its furthest point for the minimum level of gas flow. To turn off the gas flow, the knob 102 is simply rotated in the opposite direction back to the off position 146. In the examples herein, the knob 102 is rotated counterclockwise to move from the off position 146 to an on area 150, and clockwise to return to the off position 146. Of course, an opposite rotation, such as moving clockwise to the on area 150 and counterclockwise to an off position 146 could also be possible.

As best illustrated in FIG. 2, the knob mechanism 120 may include a first top part 122, a second bottom part 124, and a spring 126 or other biasing mechanism. The first top part 122 may connect to the underside of the knob 102. The first top part 122 and second bottom part 124 are connected to one another via the spring 126. The spring 126 may be a tension spring having a coil 130 formed between a first end 132 and a second end 134. The coil 130 may bias first end 132 and second end 134 away from each other. While the first part 122 and second part 124 are described as being a top and bottom, the positions may be reversed.

The first top part 122 may be fixed to the knob 102 at its underside such that the first part 122 rotates with the knob 102. The first part 122 may form a semi-circular type shape and have a perimeter. The first part 122 may define an opening 118 configured to receive a valve shaft (not shown). The knob 102 and the first part 122 may rotate about the valve shaft. The first end 132 of the spring 126 may be received by a notch 142 defined at the perimeter of the first part 122. The notch 142 may maintain the first end 132 against a lip 148 as the first part 122 rotates with the knob 102.

The second bottom part 124 may form a quadrilateral type shape and be arranged below the first part 122. However, any shape such as a circle, oval, rhombus, trapezoid, etc. The second part 124 may be maintained in a fixed position with respect to the cooktop 104 so that the first part 122 rotates with respect to the second part 124. The second part 124 may be fitted in a switch harness arranged on or below the cooking area 104.

The second part 124 may define an elongated channel 144 configured to receive the first end 132 of the spring 126. In the example shown in the figures, the elongated channel 144 may be non-linear or curved and may extend across a substantial portion of the second part 124. The elongated channel 144 may follow the path of the first end 132 as the first part 122 rotates with the knob 102. The first end 132 may be received at the notch 142 of the first part 122, as well as the elongated channel 144 of the second part 124.

The example illustrates in FIGS. 2 and 3 illustrates the knob 102 at an off position 146. This may be the normal resting position of the knob 102 where no gas is flowing and the associated burner 106 is off. In this position, the spring 126 is in a normal resting position, biasing the first part 122 away from the second part 124.

Figure 5:
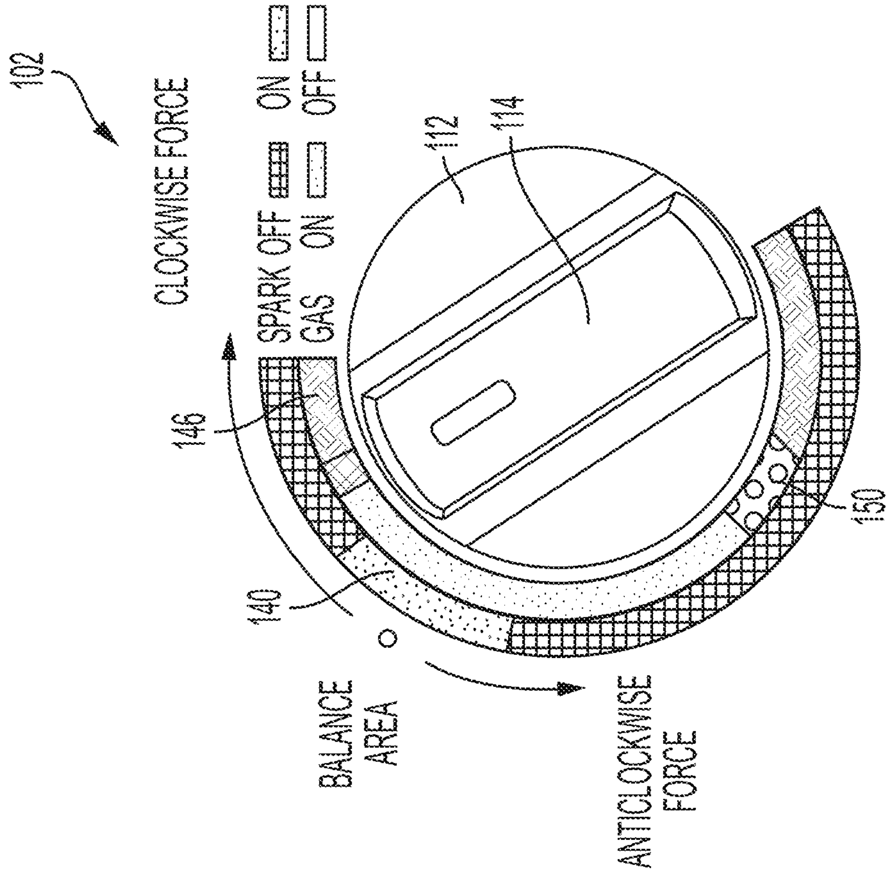
FIG. 5 illustrates an example knob of the cooktop of FIG. 1, where the knob is in a balance position.
Figure 4:
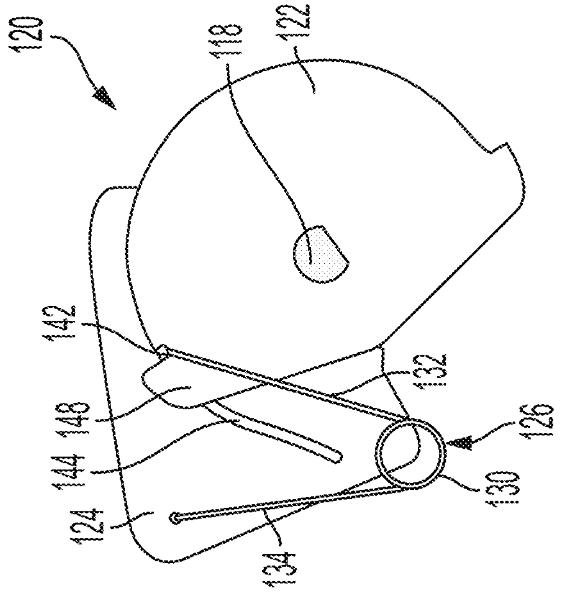
FIG. 4 illustrates an example knob mechanism for a knob of the cooktop of FIG. 1, where the knob is in a balance position.

FIG. 4 illustrates the example knob mechanism 120 for a knob 102 of the cooking area 104 of FIG. 1, where the knob 102 is in a balance area 140. FIG. 5 illustrates the example knob 102 of the cooking area 104 of FIG. 1. In this example, in contrast with the knob position illustrated in FIGS. 2 and 3, force has been applied to the knob 102 to move the knob 102 from the off position 146 to the balance area 140. In the balance area 140, the spark may initiate to start the flow of gas to the burner 106. The knob 102 may be rotated intentionally by a user in order to start the burner 106. On the other hand, however, the knob 102 may have been unintentionally bumped.

If the knob 102 was intentionally actuated, the user may continue to rotate the knob through the balance area 140. As the knob 102 rotates, so does the first part 122. The first end 132 may move along the elongated channel 144. The channel 144 may serve as a track to force the first part 122 to maintain a certain position relative to the second part 124. Most notably, the elongated channel 144 forces the first end 132 of the spring 126 to compress towards the second end 134 of the spring 126. The spring 126 then creates a bias against the rotation of the first part 122 and in turn against the rotation of the knob 102.

Due to the biasing, the user may be forced to apply a certain level of force or torque to the knob 102 in order to continue the knob 102 through and past the balance area 140 into the on area 150. This may prevent an inadvertent bump of the knob 102 from starting the spark because such a bump would not be able to overcome the bias created by the spring 126. Further, in addition to preventing the spark, the spring 126 may force the first part 122 and the knob 102 to rotate back to the off position 146 in these inadvertent instances.

As the knob 102 rotates, the first end 132 of the spring 126 travels through the channel 144 to impart resistance against the turning of the knob 102. The elongated channel 144 may define a certain spacing of the first part 122 to the second part 124 during rotation of the first part 122, which controls the relative distance between the first end 132 and the second end 134 of the spring 126, and thus control the bias force between the first end 132 and the second end 134 of the spring 126. This may ensure the appropriate amount of bias generated by the spring 126 as the user rotates the knob 102. The first end 132 may be maintained within the notch 142 while the knob 102 is in the balancing area 140.

Figure 7:
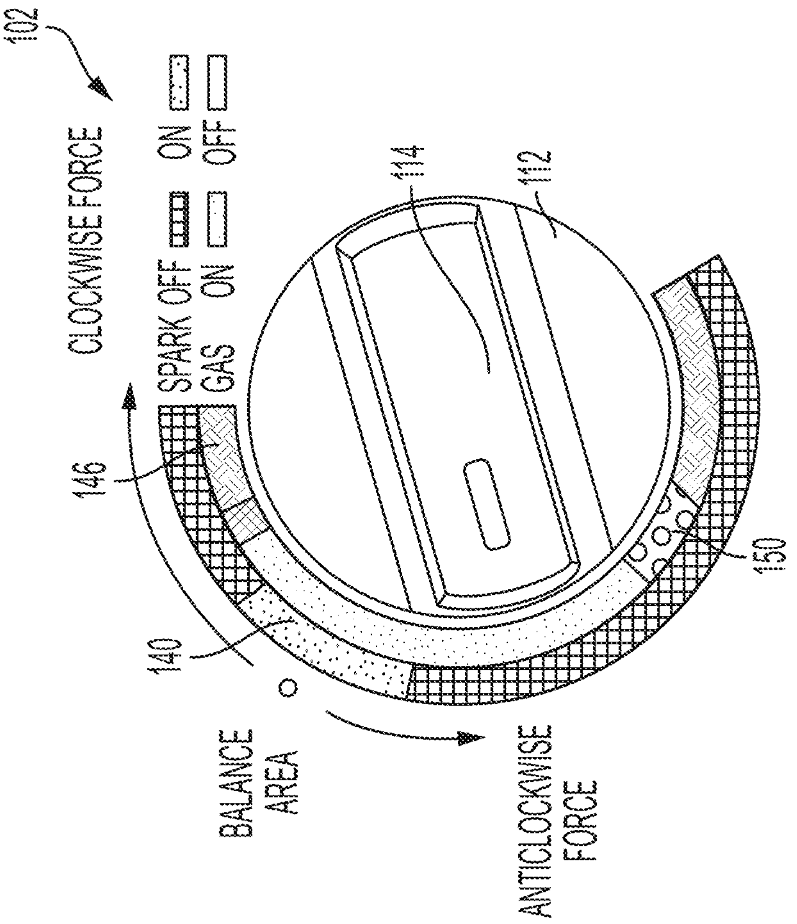
FIG. 7 illustrates an example knob of the cooktop of FIG. 1, where the knob is in an on position.
Figure 6:
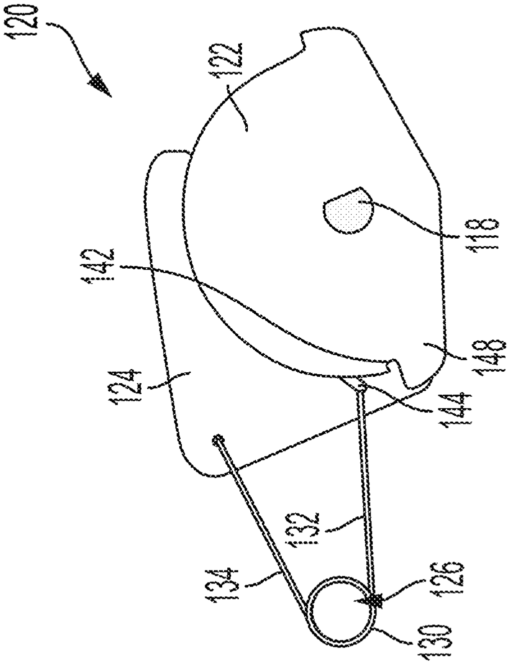
FIG. 6 illustrates an example knob mechanism for a knob of the cooktop of FIG. 1, where the knob is in an on position.

FIG. 6 illustrates the example knob mechanism 120 for a knob 102 of the cooktop 100 of FIG. 1, where the knob 102 is in the on area 150. FIG. 7 illustrates an example knob 102 of the cooktop of FIG. 1. In the on area 150, the user may vary the flow of gas to the burner 106 by rotating the knob 102. The on area 150 is arranged after the knob 102 has passed the balance area 140. The knob 102 may maintain its position once it reaches its desired flow of gas. In the on area 150, the first end 132 of the spring 126 may be arranged at an end of the elongated channel 144. In his example, the first part 122 may rotate to the extent that the first end 132 of the spring 126 disengages with the notch 142. This may be due in part to the fact that the lip 148 extends beyond the end of the channel 144, thus releasing the first end 132 from the notch 142.

Accordingly, the resistance created by the biasing of the spring 126 between the first part 122 and second part 124 may be removed and the knob 102 may be freely rotated within the on area 150 to a desired flow of gas. When the user wishes to move the knob 102 back to the off position 146, the first part 122 may rotate in the opposite direction and the lip 148 may abut the first end 132 of the spring 126 and cause the first end 132 of the spring 126 to fall back into the notch 142, similar to FIG. 4.

Thus, when the user wishes to start the burner 106, the channel 144 may maintain the first part 122 and the second part 124 in a predetermined spaced relationship with each other to create a defined resistance via the spring 126 against rotation of the knob 102. The resistance generated by the spring 126 varies as the distance between the two ends of the spring 126 vary. The larger the distance, the less resistance for rotating the first part relative to the second. The smaller the distance, the more resistance in rotating the first part relative to the second part. This may ensure that an inadvertent actuation at the knob 102 does not lead to an accidental opening of the gas flow. The notch 142 may maintain the first end 132 of the spring 126 therein until the first end 132 reaches an end of the channel 144 when the rotation of the first part 122 causes the first end 132 to release from the notch 142 and cease the resistance created by the spring 126. The resistance created by the biasing of the spring 126 requires a predefined amount of force at the knob 102 to move the first end 132 of the spring 126 through the channel 144 and the spring 126 is configured to bias the knob 102 back to the off position 146 in response to the predefined amount of force not being exceeded.

Accordingly, a controllable knob 102 is disclosed that prevents inadvertent actuation from releasing gas accidentally.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

What is claimed is:

1. A knob assembly for a gas cooktop, comprising:

a knob configured to control a flow of gas from a burner of a cooktop starting at an off position; and a knob mechanism arranged between the knob and the cooktop, the knob mechanism including a first part arranged below an underside of the knob, and a second part connected to the first part via a spring mechanism, where the first part is fixed to the knob to provide for rotation with the knob and the spring mechanism is configured to bias against the rotation of the knob, wherein the spring mechanism has a first end attached to the first part and a second end attached to the second part, the first end is received by a notch defined by the first part and an elongated channel defined by the second part such that as the first part rotates with respect to the second part, the second end travels through the channel to impart resistance against the rotation of the knob due to the bias between the first end and second end of the spring mechanism.

2. The assembly of claim 1, wherein the first part defines a semi-circular shape and the notch is defined at a curved perimeter of the first part.

3. The assembly of claim 1, wherein the first part defines an opening configured to receive and rotate about a valve shaft.

4. The assembly of claim 1, wherein the spring mechanism is a torsion spring.

5. The assembly of claim 1, wherein the channel maintains the first part and the second part in a predetermined relationship with each other to create the resistance via the spring mechanism against the rotation of the knob away from the off position to open of the flow of gas.

6. The assembly of claim 5, wherein the notch maintains the first end of the spring mechanism therein until the first end reaches an end of the channel when the rotation of the first part causes the first end to release from the notch and cease the resistance created by the spring mechanism.

7. The assembly of claim 6, wherein the spring mechanism is configured to impart the resistance until the knob is rotated past a balance portion to prevent inadvertent gas release.

8. The assembly of claim 6, wherein the resistance requires a predefined amount of force at the knob to move the first end of the spring mechanism through the channel and wherein the spring mechanism is configured to bias the knob back to the off position in response to the predefined amount of force not being exceeded.

9. The assembly of claim 1, wherein the channel defined by the second part is nonlinear.

10. The assembly of claim 1, wherein the channel defined by the second part is curved.

11. A knob assembly for a gas cooktop, comprising:

a knob configured to rotate between an off position and an on position corresponding to a desired heat setting to control a flow of gas from a burner of a cooktop; and a knob mechanism arranged between the knob and the cooktop, the knob mechanism including a first part fixed to an underside of the knob, and a second part connected to the first part via a spring mechanism, where the first part is fixed to the knob to provide for rotation with the knob and the spring mechanism is configured to bias against the rotation, wherein the spring mechanism has a first end attached to the first part and a second end attached to the second part, the second part defining an elongated channel configured to receive the first end of the spring mechanism such that as the first part rotates with respect to the second part, the second end travels through the channel to impart resistance against the rotation of the knob from the off position due to a bias between the first end and second end of the spring mechanism.

12. The assembly of claim 11, wherein the first part defines a notch configured to receive the first end of the spring mechanism such that the first end of the spring mechanism is attached to the first part and moves along the channel of the second part.

13. The assembly of claim 12, wherein the first part defines a semi-circular shape and the notch is defined at a curved perimeter of the first part.

14. The assembly of claim 11, wherein the first part defines an opening configured to receive and rotate about a valve shaft.

15. The assembly of claim 11, wherein the spring mechanism is a torsion spring.

16. The assembly of claim 11, wherein the channel maintains the first part and the second part in a predetermined relationship with each other to create the resistance via the spring mechanism against the rotation of the knob away from the off position to open of the flow of gas.

17. The assembly of claim 12, wherein the notch maintains the first end of the spring mechanism therein until the first end reaches an end of the channel when the rotation of the first part causes the first end to release from the notch and cease the resistance created by the spring mechanism.

18. The assembly of claim 17, wherein the resistance requires a predefined amount of force at the knob to move the first end of the spring through the channel and wherein the spring is configured to bias the knob back to the off position in response to the predefined amount of force not being exceeded.

19. The assembly of claim 17, wherein the spring mechanism is configured to impart the resistance until the knob is rotated past a balance portion to prevent inadvertent gas release.

20. The assembly of claim 10, wherein the channel defined by the second part is curved.

* * * * *